United States Patent
Faulkner et al.

(10) Patent No.: US 6,434,605 B1
(45) Date of Patent: Aug. 13, 2002

(54) AUTOMATIC DETECTION AND RECOVERY FOR PROBLEMS ARISING WITH INTERCONNECTED QUEUE MANAGERS

(75) Inventors: Paul Faulkner; Jeffrey S. Horton, both of Colorado Springs, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/286,565

(22) Filed: Apr. 5, 1999

(51) Int. Cl.[7] .................... G06F 11/00; G06F 13/00
(52) U.S. Cl. ................. 709/213; 709/223; 709/224; 709/206; 714/43; 370/428
(58) Field of Search ............................ 709/206, 223, 709/224, 213; 714/25, 37, 43, 1, 2, 4; 370/428, 429

(56) References Cited

U.S. PATENT DOCUMENTS

| | | | | | |
|---|---|---|---|---|---|
| 5,627,766 A | * | 5/1997 | Beaven | ............ | 702/122 |
| 5,856,978 A | * | 1/1999 | Anthias | ............ | 370/429 |
| 5,878,056 A | * | 3/1999 | Black et al. | ............ | 714/748 |
| 6,092,096 A | * | 7/2000 | Lewis | ............ | 709/200 |
| 6,138,168 A | * | 10/2000 | Kelly et al. | ............ | 709/100 |
| 6,202,089 B1 | * | 3/2001 | Juster | ............ | 709/219 |
| 6,233,576 B1 | * | 5/2001 | Lewis | ............ | 707/9 |
| 6,275,912 B1 | * | 8/2001 | Haba | ............ | 711/154 |
| 6,336,135 B1 | * | 1/2002 | Niblett et al. | ............ | 709/215 |
| 2001/0047495 A1 | * | 11/2001 | Kettley et al. | ............ | 714/2 |

FOREIGN PATENT DOCUMENTS

| | | | |
|---|---|---|---|
| GB | 2301912 A | * | 12/1996 |
| GB | 2304944 A | * | 3/1997 |
| GB | 2313524 A | * | 11/1997 |
| GB | 2341057 A | * | 3/2000 |

* cited by examiner

*Primary Examiner*—Kenneth R. Coulter

(57) ABSTRACT

An automation package may include facilities for enhancing the monitoring and recovery capabilities of a computer system within a distributed system. The automation package monitors interconnected queue managers. The queue managers are responsible for managing respective message queues and channels. The automation package automatically detects problems, such as the failure of the channel, and takes proactive steps to resolve the problems that are detected. As a result, there is no need for manual intervention and manual detection of problems. The automation package may include notification capabilities for notifying parties of problems.

25 Claims, 12 Drawing Sheets

AUTOMATIC DETECTION AND RECOVERY FOR PROBLEMS ARISING WITH INTERCONNECTED QUEUE MANAGERS

TECHNICAL FIELD

The present invention relates generally to data processing systems and more particularly to automatic detection and recovery for problems arising on a channel that interconnects queue managers.

BACKGROUND OF THE INVENTION

The MQSeries software from International Business Machines Corporation is a type of message oriented middleware. In particular, MQSeries is messaging software that allows application programs to exchange information across different software platforms. The MQSeries software resolves problems of interconnectivity. Hence, an application that runs on a first type of platform may communicate with another application that runs on a different type of platform. The differences in platforms may be due, for example, to differences in operating systems.

The MQSeries software utilizes queues to facilitate the exchange of information between applications. As shown in FIG. 1, a first application 10 may send a message 12 to a queue 14. Subsequently, second application 16 may receive the message 12 from the queue 14. The transfer of the message 12 may be performed asynchronously such that the application 10 need not wait on the application 16 and application 16 need not wait on the application 10.

With the MQSeries software, a message is a string of bytes that has meaning to the applications that use the message. Each message includes application data and a message descriptor. The message descriptor identifies the message and contains control information such as type information and the priority assigned to the message by the sending application. The application data may take many forms. The content of the application data is controlled by the application that constructs the message.

A queue is a data structure that stores messages. Each queue exists independently of the applications that use the queue. As shown in FIG. 2, queues are managed by queue managers. The queue manager insures that messages are put on the proper queue and routed to the appropriate destinations. Each queue manager is manifest as a separate object of the queue manager or object type. As shown in FIG. 2, the application 10 sends a message 12 to the queue manager 18, which stores the message 12 on the queue 14. The queue manager 18 retrieves the message 12 from the queue 14 and forwards the message to the application 16. As will be described in more detail below, the application programs are written using a common program interface, known as message queue interface (MQI). The MQI allows application programs that are running on different computers and/or different operating systems at different locations to communicate with queue managers. The applications communicate with the queue manager by issuing MQI calls.

Communication between applications need not be in one direction alone. As shown in FIG. 3, applications 10 and 16 may both receive messages and transmit messages. In the example depicted in FIG. 3, message 12 is sent from application 10 through queue 14 onto application 16. Conversely, message 20 is sent through queue 22 from application 16 to application 10.

The MQSeries software exploits the concept of a channel. A channel is a logical communication link between two queue managers. FIG. 4 depicts an instance wherein two channels 38 and 40 interconnect queue managers 32 and 36. Channels are available in two varieties: message channels and MQI channels. FIG. 4 depicts some examples of message channels. Message channels are unidirectional and serve to transfer messages from one queue manager to another. Message channels connect the queue managers via message channel agents (MCA's). In the example depicted in FIG. 4, queue manager 32 manages queue 30 and queue manager 36 manages queue 34. Message channel 38 links queue manager 32 and 36 so that messages may be sent over the message channel from queue manager 32 to queue manager 36. Message channel 40 carries messages from queue manager 36 to queue manager 32.

An MQI channel connects a client to a queue manager on a server machine. A client is a section of code that is installed on a machine to accept MQI calls from applications and pass them on to an MQI server machine. An MQI server is a queue manager that provides queuing services to one or more clients. In the example shown in FIG. 5, client 40 is interconnected by MQI channel 48 with queue manager 44. The queue manager 44 manages access to queue 42. The MQI channels, unlike message channels, are bi-directional so that both calls and responses may be sent over a single channel.

As mentioned above, message channels interconnect MCA's. An MCA is a program that controls the sending and receiving of messages. An MCA is positioned at each end of a channel. One MCA takes messages from a transmission queue (defined below) and puts the messages on the communication link. The other MCA receives 35 messages and delivers the messages to a remote queue manager. The MCA that initiates a communication is called a caller MCA, whereas the MCA that responds to a communication is a responder MCA. As shown in FIG. 6, MCA's 62 and 64 are at respective ends of channel 60. Channel 60 interconnect queue manager 50 and queue manager 52.

Queue manager 50 includes a transmission queue 54. A transmission queue is a special type of local queue that is used to store messages temporarily before the messages are transmitted by an MCA to a remote queue manager. In the example shown in FIG. 6, MCA 62 transmits messages from the transmission queue 54 to the remote queue manager 52.

The queue manager 50 includes an initiation queue 56. The initiation queue 56 holds messages that are used to trigger a channel initiator 66 to start the MCA 62. Hence, before a message is sent, the message is first stored in the transmission queue 54. If the message satisfies triggering criteria for the queue, a separate message is sent to the initiation queue 56, causing the triggering of the channel initiator 66. The channel initiator 66 acts as a trigger monitor for sending MCA's (such as sender MCA 62). The channel initiator 66 causes the sender MCA 62 to grab the message from the transmission queue 54 and send the message over the channel 60 to the remote queue manager 52.

The remote queue manager 52 includes a channel listener 68. A channel listener 68 is a program that monitors the channel to determine when to start the responder MCA 64. The responder MCA 64 is started in response to a start-up request from sender MCA 62. The channel listener 68 detects incoming network requests and starts the associated channel.

One difficulty with systems developed using the MQSeries software is that problems may arise relating to a channel. For example, a channel may fail. The MQSeries provides no built-in mechanism for automatically detecting such a failure and responding by attempting to restart the channel. Similarly, channel initiators and listeners may fail. Once again, there is no built-in mechanism within the MQSeries software for automatically restarting or reviving channel initiators or listeners.

The MQSeries software allows messages to be sent in predefined sequences over channels. Sequence numbers may be attached as tags to messages so that messages are sent and received in the same order. Unfortunately, there is no mechanism provided within the MQSeries software for automatically detecting and recovering from sequence errors when the messages get out of sequence.

SUMMARY OF THE INVENTION

The present invention addresses the limitations of conventional systems by providing a mechanism for automatically detecting and recovering from problems that arise relating to a channel in a distributed computing system. Specifically, in one embodiment of the present invention, failure of the channel is automatically detected. Upon detection of failure of the channel, the embodiment of the present invention attempts to automatically recover by reviving or restarting the channel. If such efforts fail, notifications in the form of reports, pages or emails may be sent to appropriate parties to advise the parties of the problem. Similarly, automatic detection and recovery is provided for problems relating to channel listeners and initiators.

The present invention may also provide for detection and recovery of sequence errors. The present invention may provide a mechanism for identifying when messages are out of sequence, resulting in a sequence error. Recovery mechanisms may be used to attempt to resolve the sequence error.

In accordance with one aspect of the present invention, a method is practiced in a distributed system that has a first queue for holding messages and a second queue for holding messages. A first queue manager is provided for managing the first queue, and a second queue manager is provided for managing the second queue. A channel interconnects the first queue manager with the second queue manager. An initiator is provided for initiating the sending of the message of the channel and a listener is provided for initiating the receiving of a message over the channel. A determination is made whether the listener or the initiator is inactive. Where it is determined that the listener or the initiator is inactive, corrective action is taken to revive the inactive listener or initiator.

In accordance with another aspect of the present invention, a determination is made whether the channel has stopped. If it is determined that the channel has stopped, corrective action is automatically taken to start the channel without prompting by user. Notifications may be generated to inform the appropriate parties of the problem.

In accordance with a further aspect of the present invention, a sequence of messages to be sent over a channel are provided. Each message is tagged with an associated sequence value that identifies the position of the message within the sequence. An out of sequence condition is detected at one of the queue managers, indicating a sequence error for at least one of the messages in the sequence. A reset of the sequence value to a known sequence value is initiated such that the next message to be sent in the sequence is tagged with the known sequence value.

In accordance with an additional aspect of the present invention, a computer system is provided in a distributed system. The computer system includes a channel monitor for monitoring activity with respect to the channel to detect problems. The computer system includes a recovery component for automatically recovering from problems in response to the detection from the channel monitor.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides an automation package that is suitable for use with the MQSeries software to detect problems relating to channels within a distributed system. The automation package also provides support for automatic recovery from problems without requiring user prompting or intervention. As a result, the automation package may detect problems and rectify the problems without the need for user intervention. This insures that a proper response to a problem is generated and also diminishes down time by quickly detecting and recovering from problems.

The automation package provides facilities for detecting sequence errors. Sequence errors arise when a sequence of messages that are to be transmitted and received in a predefined sequence get out of order such that they are transmitted or received in the wrong sequence. The automation package provides resources for detecting such sequence errors and takes corrective actions to remedy the sequence errors that have been detected.

The automation package will be described below relative to three primary components. The first primary component is the channel initiator/listener reviver (CILR). The CILR component automatically identifies when a transmission queue is filling up (i.e. the current queue depth is high). When such a condition is detected, the CILR component automatically determines whether a channel initiator and channel listener for the associated channel are inactive. If the channel initiator and/or channel listener are determined to be inactive, corrective action is taken. The CILR component provides certain notification capabilities as well.

A second component of the automation package is the channel essential start script (CHESS). The CHESS component provides the capabilities to automatically detect when a channel is stopped and to automatically restart the channel. The CHESS component also provides notification capabilities.

The automated channel sequence error reset (ACSER) component identifies when a channel sequence number is out of order. The ACSER component determines whether the channel is not active and detects the correct sequence number. The ACSER component takes corrective action to reset channel sequence numbers and provides notification identifying whether the corrective action was successful or not.

Figure 1:
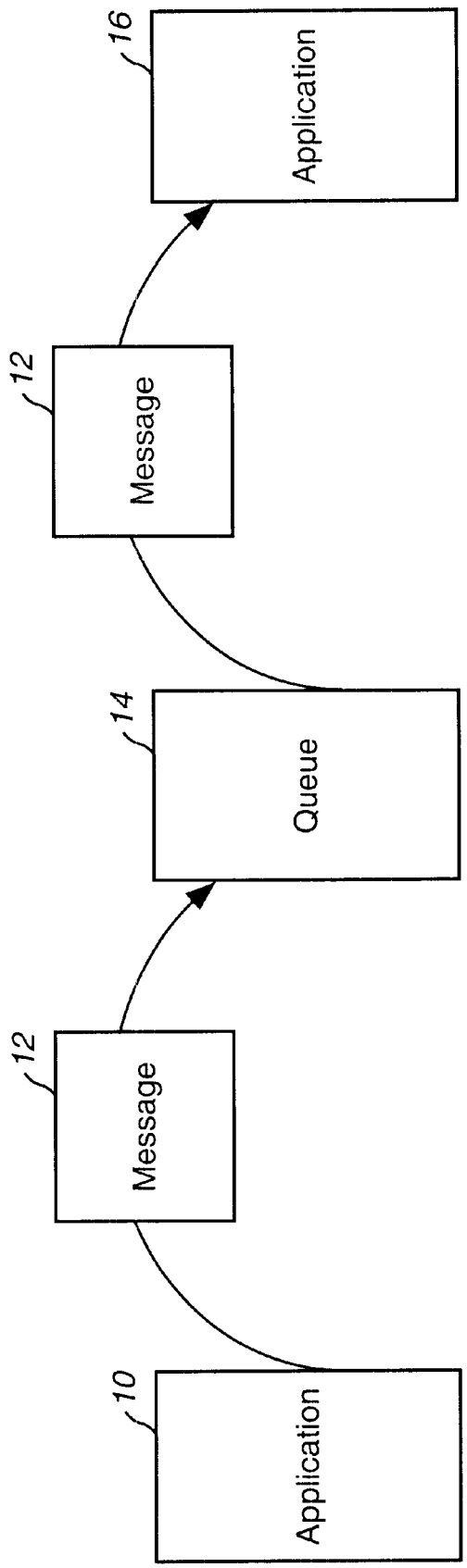
FIG. 1 depicts the use of a queue in a conventional MQSeries system to facilitate communication of a message between applications.
Figure 2:
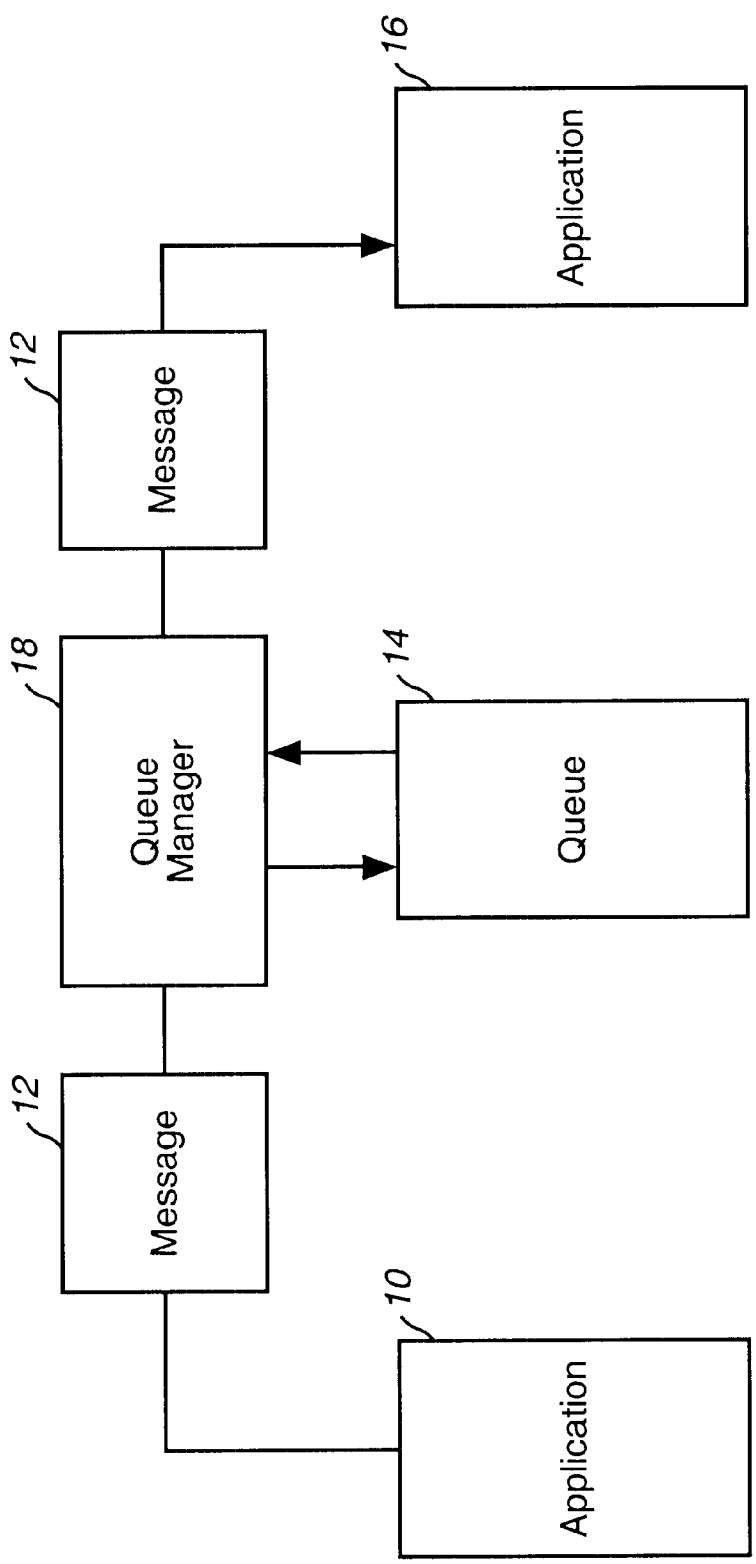
FIG. 2 depicts the role of a queue manager in a conventional MQSeries system.
Figure 3:
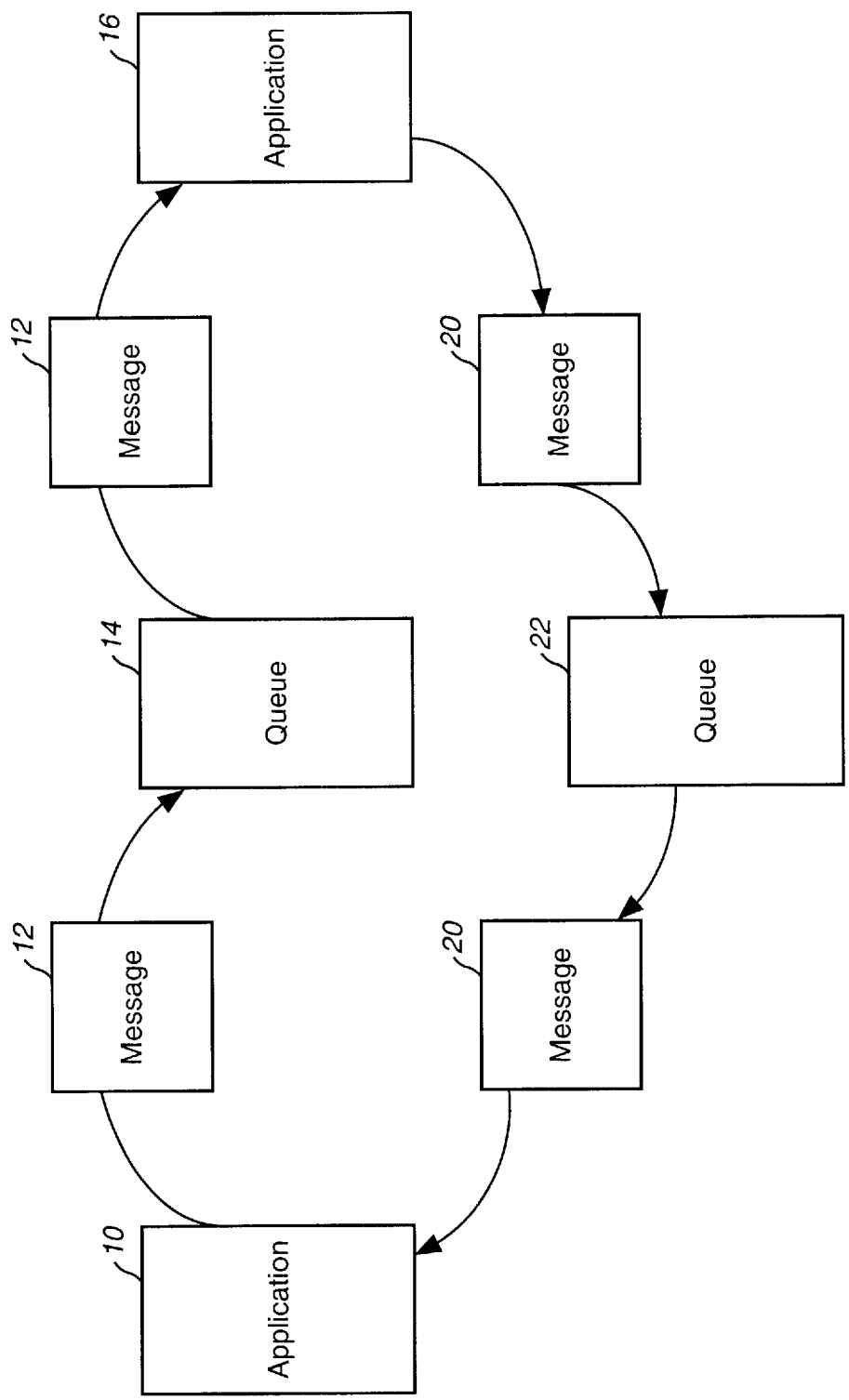
FIG. 3 depicts the communication of messages to and from application programs in a conventional MQSeries system.
Figure 4:
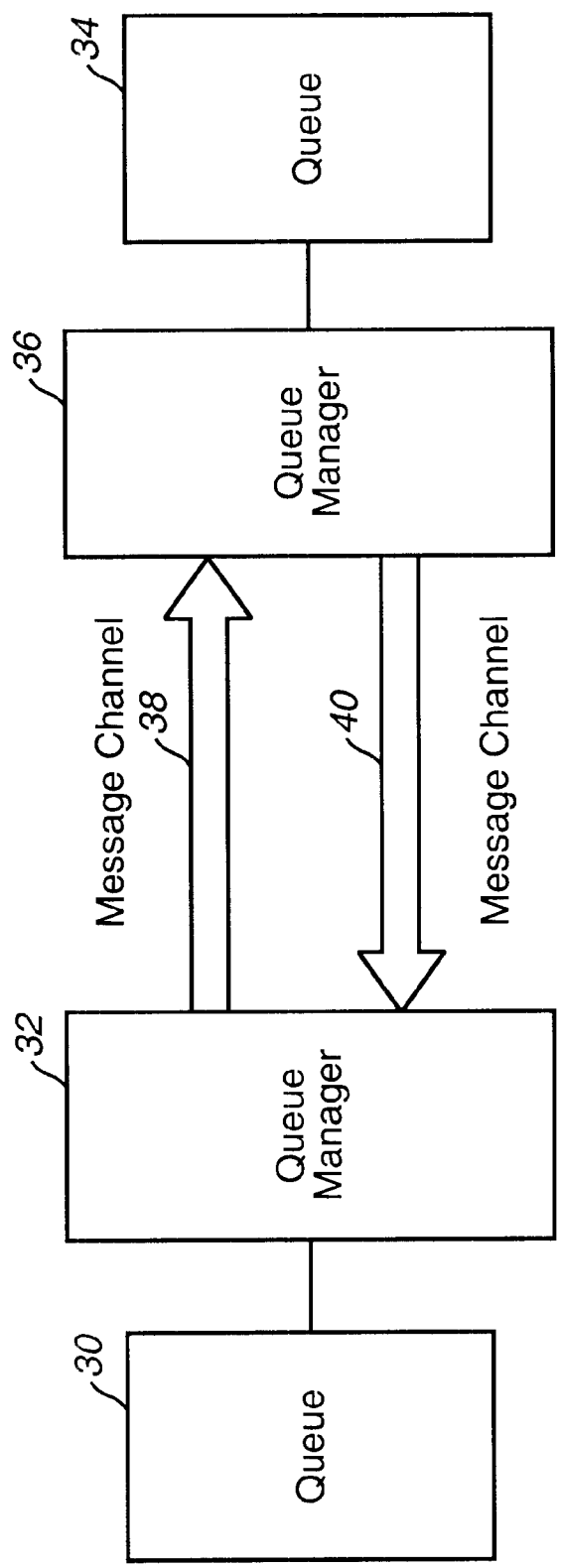
FIG. 4 depicts two message channels interconnecting queue managers in a conventional MQSeries system.
Figure 5:
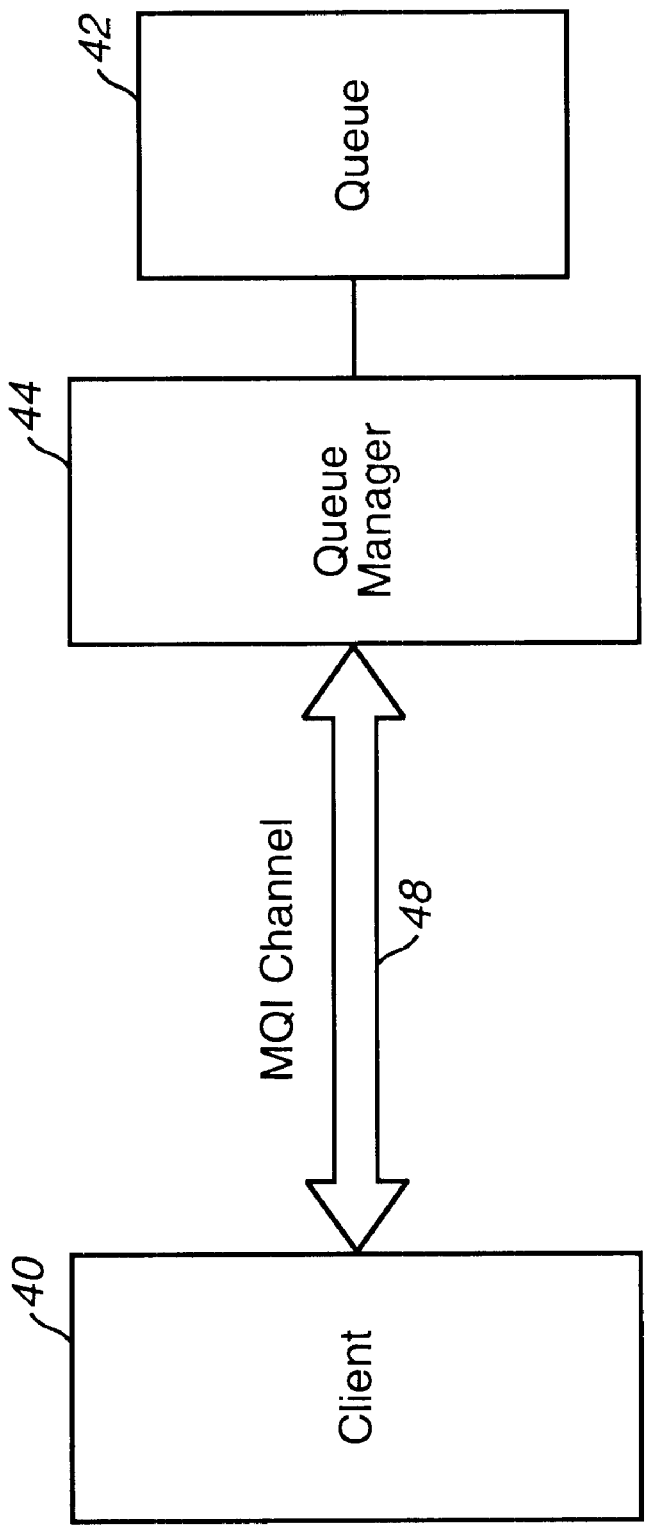
FIG. 5 depicts an MQI channel that is used to interconnect a client and a queue manager in a conventional MQSeries system.
Figure 6:
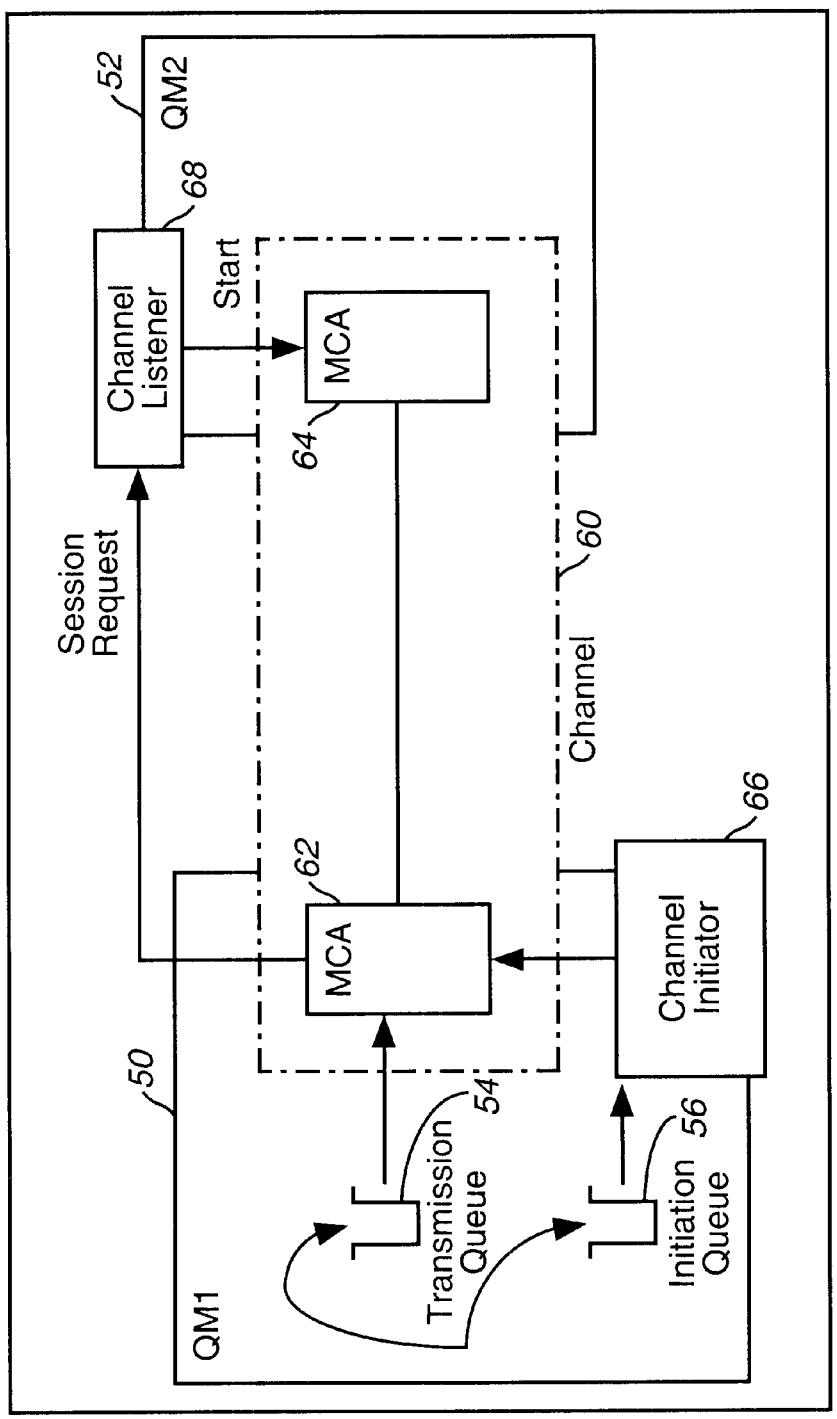
FIG. 6 depicts the use of a transmission queue, an initiation queue, a channel initiator and a channel listener in a conventional MQSeries system.
Figure 7:
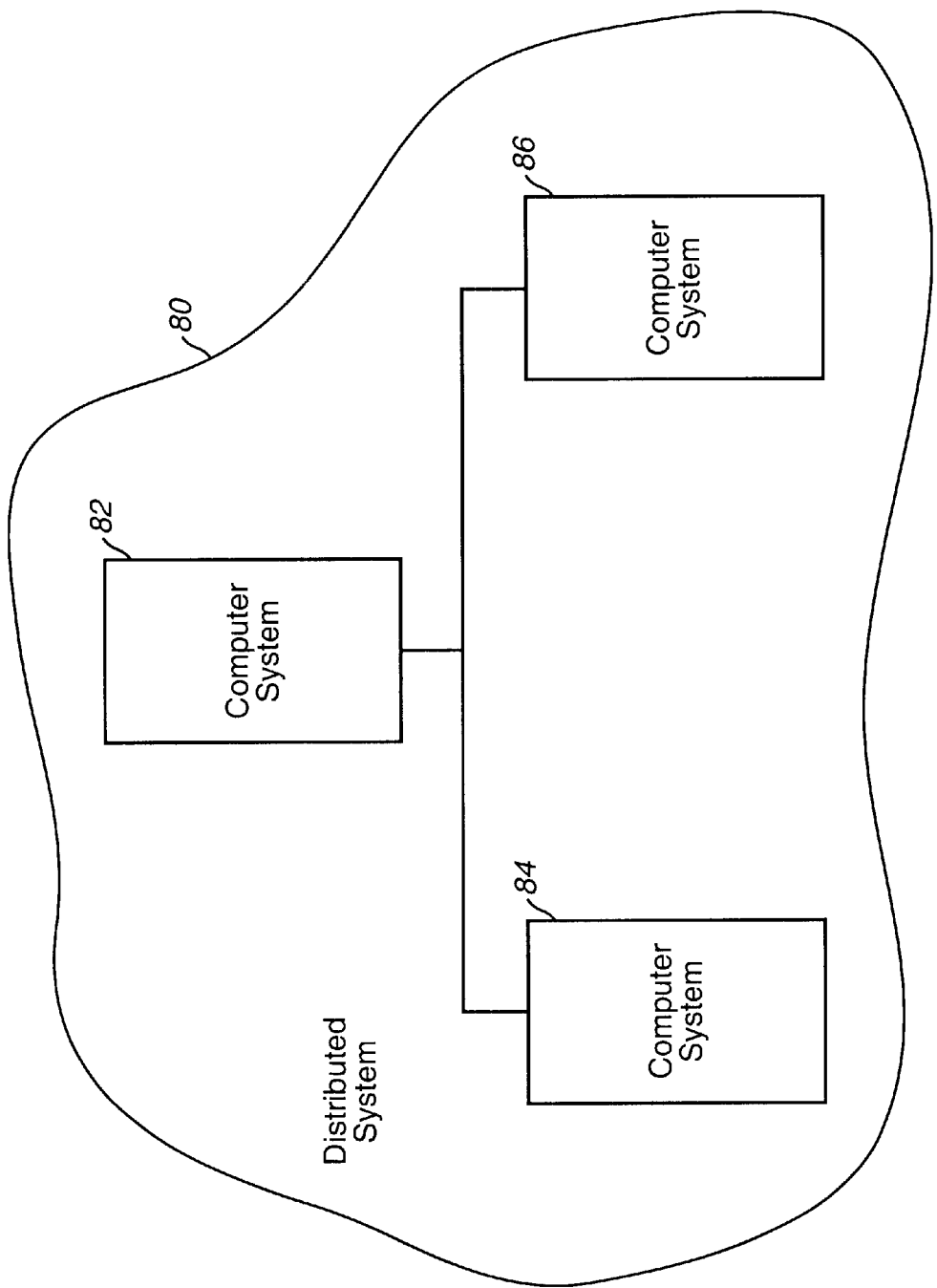
FIG. 7 depicts a distributed system that is suitable for practicing the illustrative embodiment of the present invention.

The illustrative embodiment is practiced within a distributed system 80, such as shown in FIG. 7. The distributed system may include a number of computer systems 82, 84 and 86 that are interconnected by a networking infrastructure. The distributed system 80 may be a local area network (LAN) or a wide area network (WAN). As used herein, a "distributed system," refers to a loosely coupled system which processors do not share a memory or a clock. The processors communicate with each other over various communication lines or paths. A distributed system is intended to be in contrast with a tightly coupled system, wherein multiple processors share a memory and clock.

In the illustrative embodiment, it is assumed that one or more of the computer systems 82, 84 and 86 contain application programs that desire to communicate with each other. These application programs may communicate with each other using queues and channels provided by the MQSeries system software. The applications may reside on different ones of the computer systems 82, 84 and 86. Various message channels may interconnect queue managers for queues on the respective computer systems 82, 84 and 86. Configurations like that depicted in FIGS. 1–6 may be realized. The applications may contain a number of MQI calls as required.

Those skilled in the art will appreciate that the depiction of the distributed network shown in FIG. 7 is intended to be merely illustrative and not limiting of the present invention. The distributed system may take many forms. For example, the distributed system may be an intranet, and an extranet or even the Internet. As mentioned above, the distributed system 80 may also be a LAN or other variety of WAN. The distributed system may include significantly more computer systems than depicted in FIG. 7. The depiction in FIG. 7 is intended to be merely illustrative.

Figure 8:
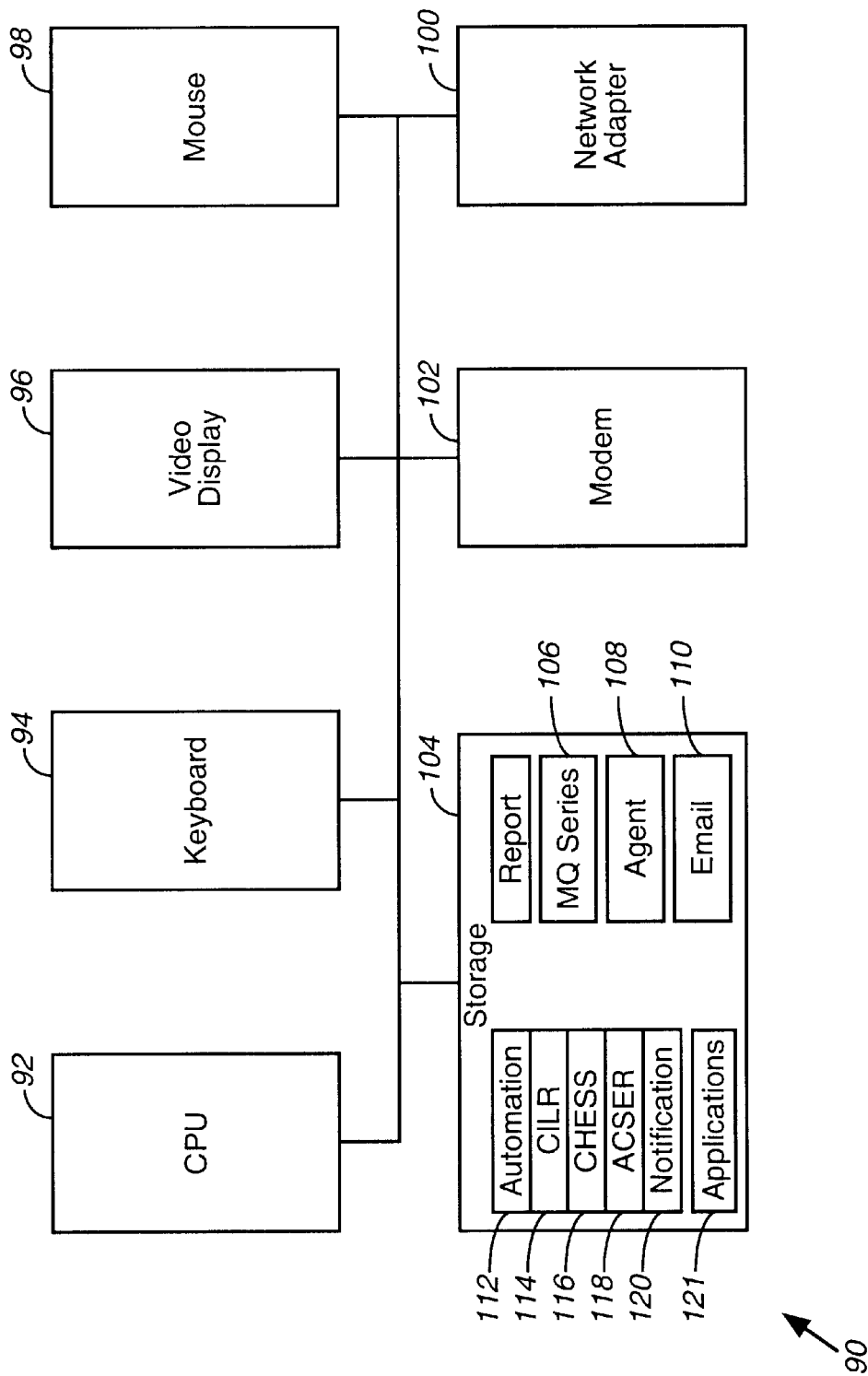
FIG. 8 depicts a logical organization of a computer system that is suitable for practicing the illustrative embodiment of the present invention.

FIG. 8 depicts an example of a format of a computer system 90 within the distributed system for practicing the illustrative embodiment of the present invention. The computer system 90 includes typical devices such as a central processing unit (CPU) 92 for executing instructions and overseeing operation of the computer system. The computer system 90 may also include a number of peripheral devices, including an input device, such as a keyboard 94 and a mouse 98. The computer system 90 may also include a number of output devices, including a video display 96. Additional peripherals may be provided to facilitate communication with other computing resources. For example, the computer system may include a modem 102 for communicating over analog telephone lines, wireless links or cable connections with other computer systems. The computer system may include a network adapter 100 for interfacing the computer system with a computer network.

The computer system 90 includes storage 104, which may include both primary storage and secondary storage. The storage 104 may include removable computer-readable media, such as CD ROMs, a magnetic disk and as well as other storage devices. The storage 104 includes support for the MQSeries software 106. Although the illustrative embodiment will be described below relative to an implementation that uses the MQSeries software, those skilled in the art will appreciate that the present invention may be practiced with other messaging software. The storage 104 may also include support for an agent such as the Candle Command Center autonomous agent. This agent 108 allows the addition of the automation support 112 to the existing monitoring capabilities provided by the MQSeries 106. The storage 104 may also hold support 110 for electronic messaging. Computer system 90 may include a number of applications 121 within the storage 104. These applications include MQI calls for communicating with queue managers.

The storage 104 holds the automation package 112. The automation package 112 includes a CILR component 114, a CHESS component 116, an ACSER component 118 and notification support 120. The notification support 120 is capable of generating notifications in different forms, including the generation of pages, the generation of electronic mail messages, the generation of facsimile messages, the generation of telephone calls and the generation of problem tickets.

Figure 9:
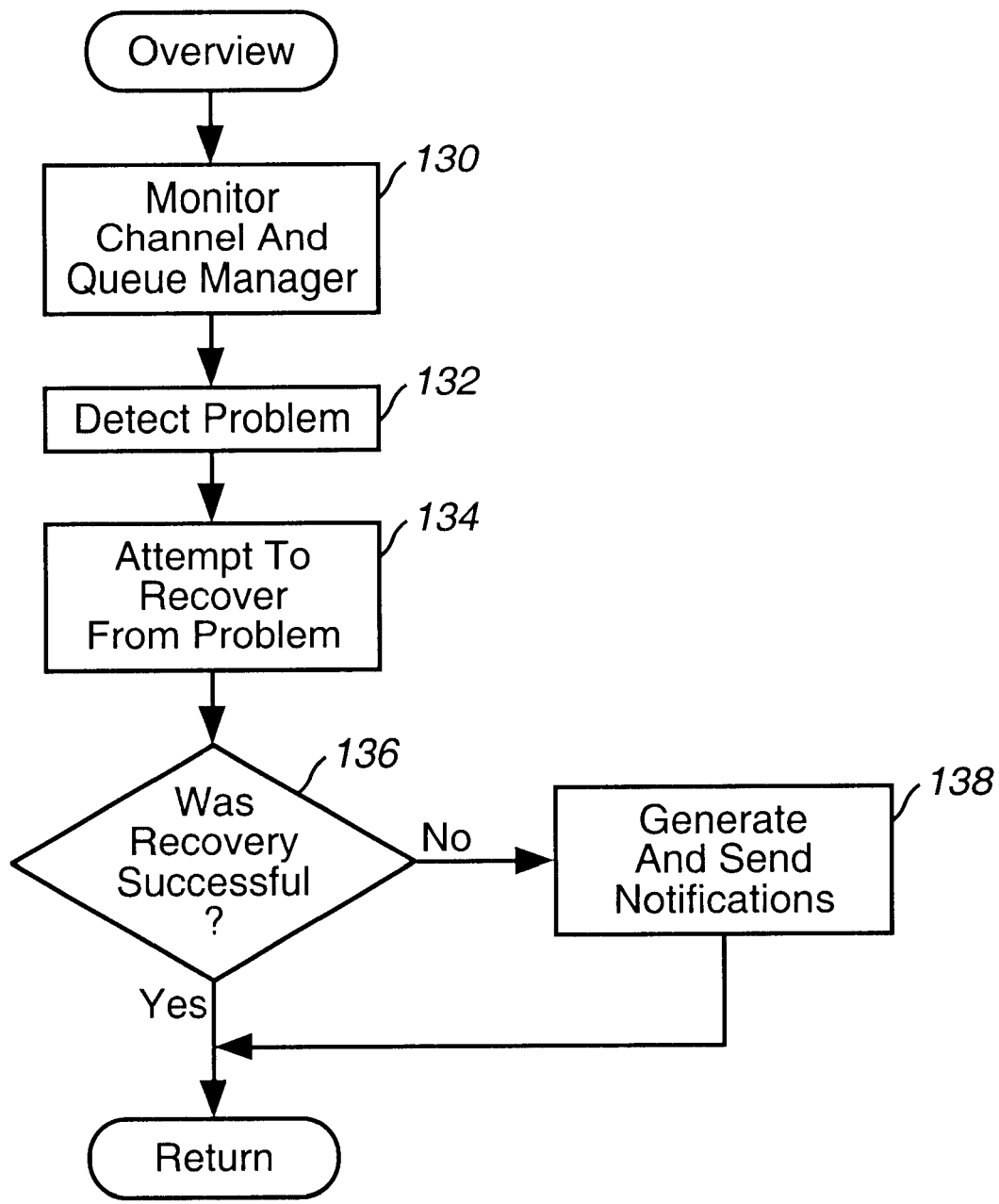
FIG. 9 is a flow chart that provides an overview of steps that are performed to detect an recover from problems in the illustrative embodiment.

FIG. 9 is a flow chart that provides an overview of the steps performed by components of the automation in the illustrative embodiment. These components monitor the channel and queue manager (step 130 in FIG. 9) to identify any problems that may arise. The components may then detect a problem relating to the channel (step 132 in FIG. 9). The components attempt to recover from the problem by taking corrective action (step 134 in FIG. 9). After the corrective actions are performed, the determination is made whether the recovery was successful or not (step 136 in FIG. 9). If the recovery was not successful, notifications may be generated and sent to appropriate parties (i.e. administrators, service personnel and the like) to advise the appropriate parties of the problem (step 138 in FIG. 9). In some instances, notifications may also be generated for successful recovery.

In general, each of the components may be divided into two subcomponents. The first subcomponent is the channel monitor that monitors activity on the channel. The channel monitor is responsible for detecting the problems. The second subcomponent is the recovery component which attempts to recover from the problem once it is detected. The recovery component operates without prompting by a user or without requiring interactive activity by the user. A notification subcomponent may also be provided to generate appropriate notifications.

Figure 10:
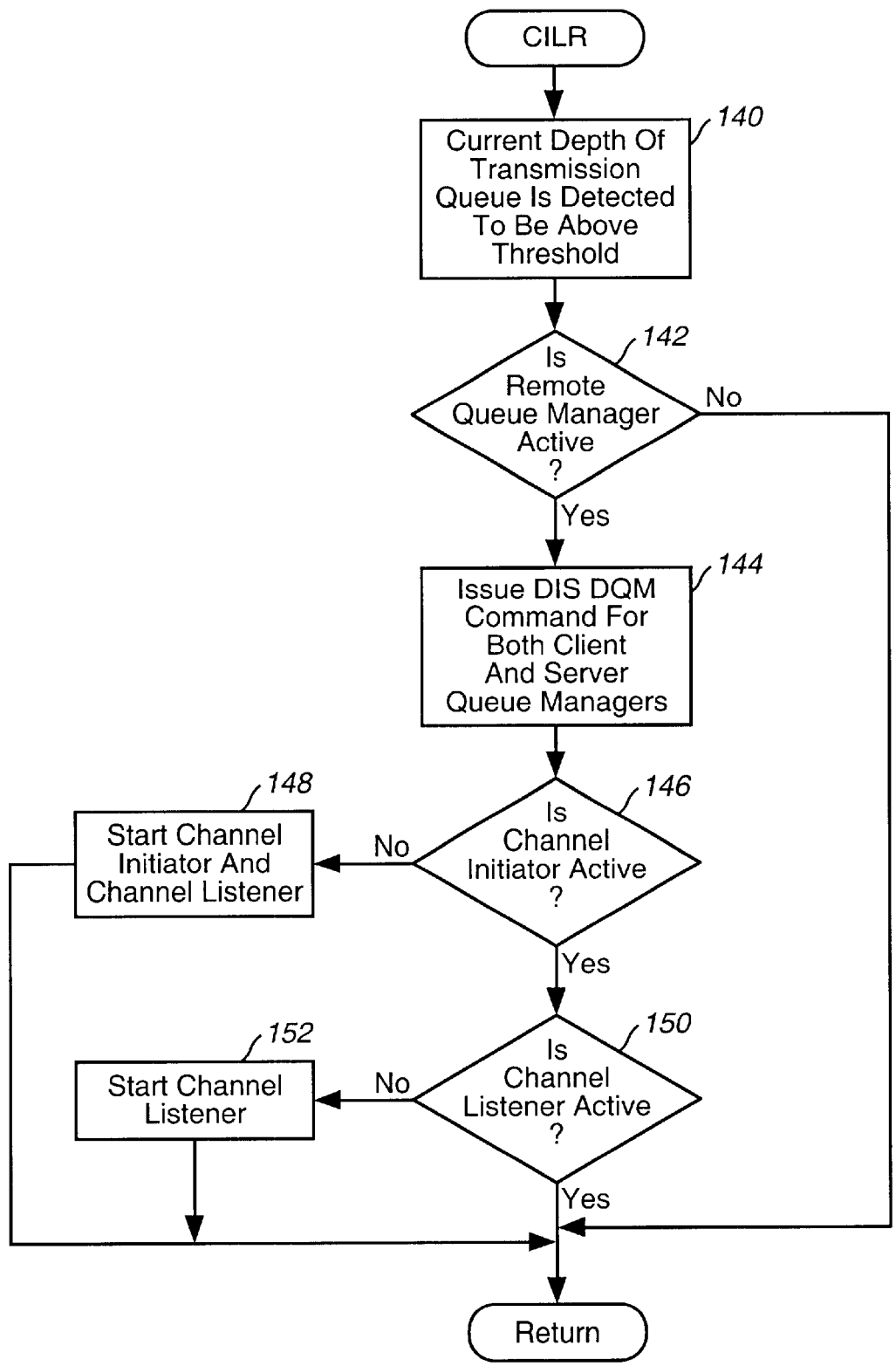
FIG. 10 depicts the steps that are performed to determine whether a channel initiator or listener has failed and to recover from the failure in the illustrative embodiment.

As was mentioned above, the CILR 114 is a component in the automation package 112 that attempts to monitor the activities of channel listeners and initiators. FIG. 10 provides a flow chart of the steps that are performed by the CILR component 114. The CILR component 114 monitors the current depth of a transmission queue. Queues are implemented as objects by the MQSeries systems. One of the attributes of a queue is the current depth. Hence, the CILR component 114 queries the queue object to obtain an attribute value for the current depth attribute. The CILR component 114 compares this current depth to a threshold (e.g. 5000 messages) to determine if the current depth is above the acceptable threshold (step 140 in FIG. 10). If the current depth exceeds a threshold, it is an indication that the transmission queue is becoming backlogged and that there is a problem associated with the channel. For purposes of the discussion above, we assume that the channel has a configuration like that depicted in FIG. 6. The CILR component 114 is monitoring a single channel in that instance. Nevertheless, multiple instances of the CILR component 114 may be monitoring multiple channels and multiple transmission queues.

The CILR component 114 initiates corrective action when it is determined that the current depth of the transmission queue 54 (see FIG. 6) is greater than the acceptable threshold (step 140 in FIG. 10). The CILR component 114 checks whether the remote queue manager 52 is active or not (step 142 in FIG. 10). If the remote queue manager 52 is inactive, the source of the problem is known, and the CILR component 114 has completed its job. Other components may be utilized to reactivate the remote queue manager 52. However, if the remote queue manager 52 is determined to be active (step 142 in FIG. 10), additional steps must be taken. The CILR component 114 issues a DIS DQM command for both the client and server queue managers 50 and 52, respectively (step 144 in FIG. 10). The DIS DQM command is defined as part of the MQI to display information regarding the distributed queue manager. The status information that is displayed indicates whether the channel initiator 66 and the channel listener 68 are active or not. The CILR component 114 analyzes the status information to determine whether the channel initiator is active (step 146 in FIG. 10). If the channel initiator is not active, the channel initiator and the channel listener are started by issuing START INITIATOR and START LISTENER MQI commands (step 148 in FIG. 10). If, in contrast, it is determined in step 146 of FIG. 10 that the channel initiator is active, the CILR component 114 checks whether the channel listener is active (see step 150 in FIG. 10). If the channel listener is not active, the CILR component 114 issues a START LISTENER command (step 152 in FIG. 10) to restart the channel listener.

Hence, the CILR component 114 is able to detect that the transmission queue 54 is getting too full and to determine whether the cause of the problem is an inactive channel initiator or an inactive channel listener. The CILR component 114 has capabilities for automatically restarting the channel initiator or channel listener as needed. Thus, there is no need for manual intervention. As a result, there is less down time and less opportunity for human error. Furthermore, the transmission queue is less likely to overflow and cause the loss of messages.

In an alternate embodiment, the status information may be displayed on the video display 96 in response to the DIS DQM command (see step 144 in FIG. 10). The automation package 112 may display user interface elements that allow an operator to restart the channel initiator or channel listener.

Figure 11:
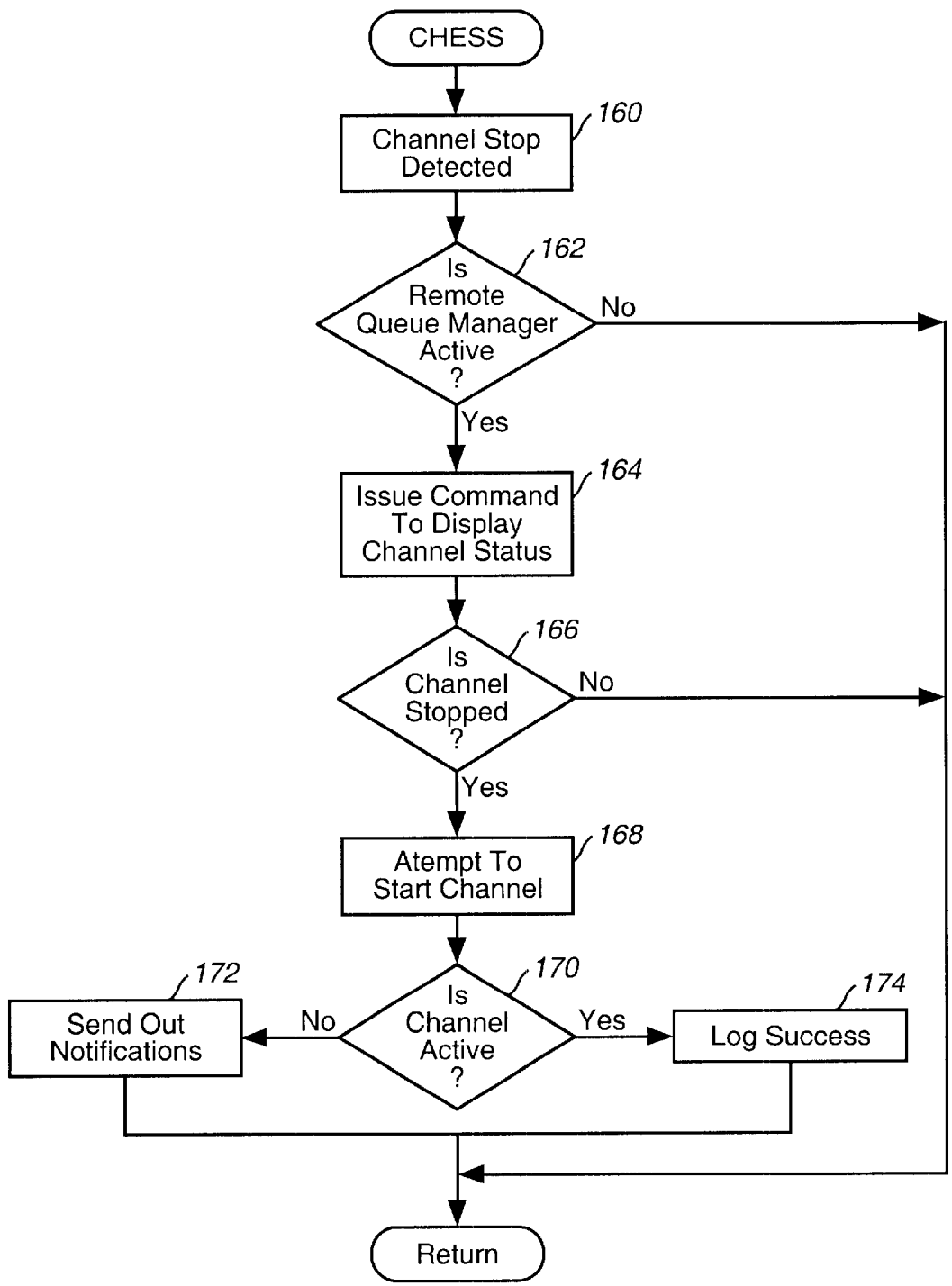
FIG. 11 is a flow chart that depicts the steps that are performed to detect and recover from failure of a channel in the illustrative embodiment.

The CHESS component 116 of the automation package 112 detects when a channel has stopped and attempts to automatically revive the channel. FIG. 11 provides a flow chart of the steps performed by the CHESS component 116. Initially, a channel stop is detected (step 160 in FIG. 11). The MQSeries software 106 generates an event in the form of an exception when a channel is stopped. Events are put in event queues that the CHESS component 116 monitors. When a channel stop event arises, the CHESS component 116 determines whether the remote queue manager 52 is active or not (step 162 in FIG. 11). If the remote queue manager 52 is inactive, the source of the problem is identified and remedial measures may be initiated. However, if the remote queue manager 52 is active, additional steps must be taken to identify the source of the problem in an attempt to take corrective action. In such an instance, the CHESS component 116 issues the command to display the channel status (step 164 in FIG. 11). Specifically, the CHESS component 116 issues a DISPLAY CHSTATUS command. This MQI command causes status information regarding the channel to be displayed on the video display 96. The CHESS component 116 analyzes the status information to determine whether the channel has stopped or not (step 166 in FIG. 11). The status information identifies whether the channel is stopped, stopping or running. If the channel is not stopped, the channel stop exception is erroneous and no further action need be taken. However, if the channel is determined to be stopped, the CHESS component 116 attempts to start the channel by issuing a START CHANNEL command (step 168 in FIG. 11). This MQI command attempts to start a channel.

After efforts have been made to attempt to restart the channel, the CHESS component 116 makes a check whether the efforts were successful (step 170 in FIG. 11). If the channel remains stopped, notifications are generated identifying the problem, and the notifications are sent out to the appropriate parties. If the channel is active (indicating that the efforts were successful), the successful restarting is logged (step 174 in FIG. 11).

The ACSER component 118 performs activities relating to message sequence numbering. Message sequence numbering is useful in environments where messages are guaranteed to be delivered without duplication and to be delivered in the same order they were taken from the transmission queue. When message sequence numbering is used, each message is sent such that it is tagged with an individual sequence number that is increased by one for each message sent. The sequence number is assigned at the sending end of the channel.

Figure 12:
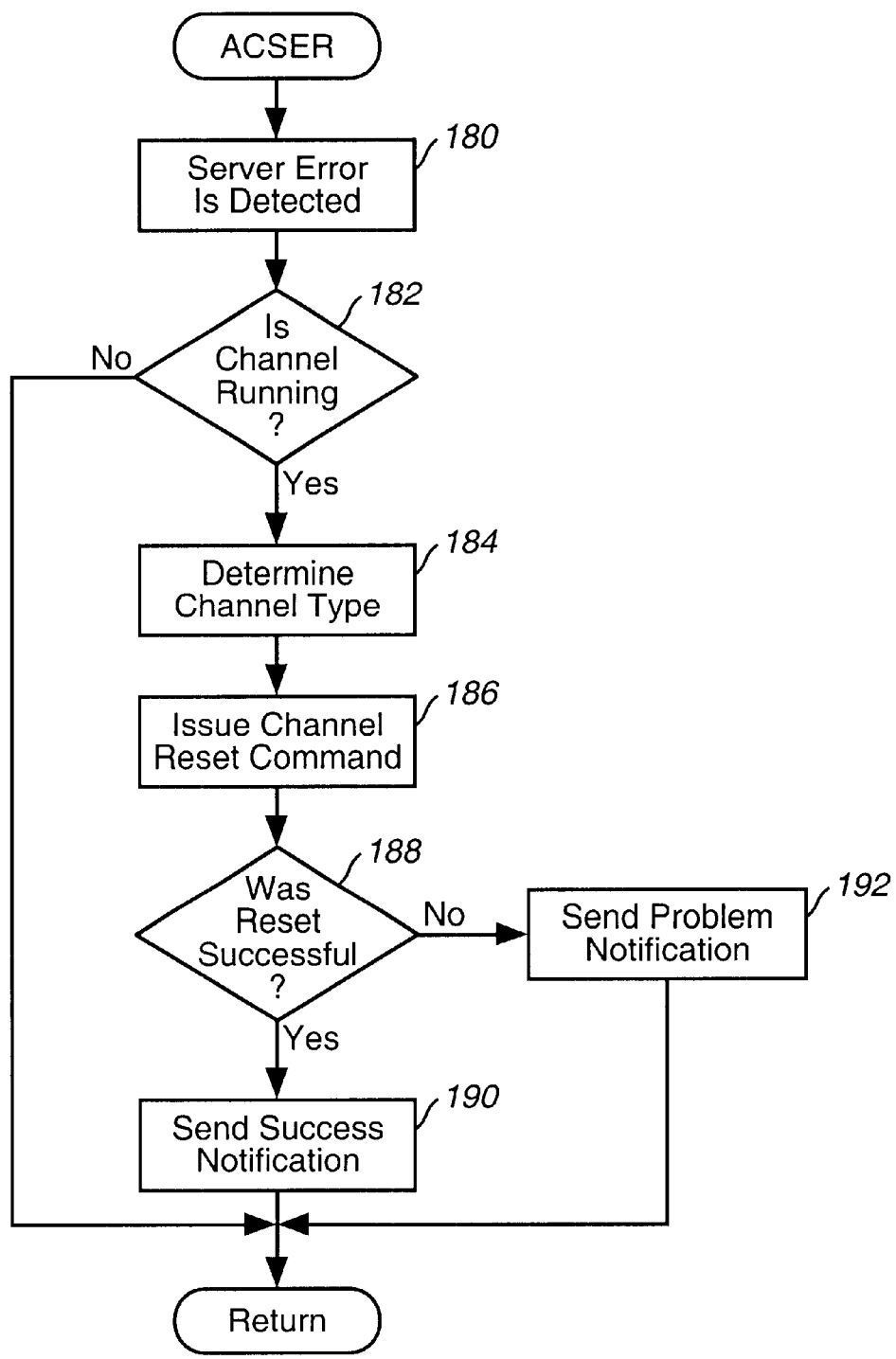
FIG. 12 is flow chart illustrating the steps that are performed to detect and recover from a sequence error in the illustrative embodiment.

FIG. 12 is a flow chart that illustrates the steps performed by the ACSER component 118. Initially, a sequence error is detected (step 180 in FIG. 12). The MQSeries system software 106 includes capabilities for detecting sequence numbers and identifying sequence errors. Sequence errors may indicate that a message was received that is out of order. The ACSER then checks whether the channel is running or not (step 182 in FIG. 12). If a sequence error is detected and the channel is running, the sequence error is regarded as an erroneous message. However, if the channel is not running, the determination is made if the channel is a sender channel or a receiver channel (step 184 in FIG. 12). A channel reset command is then issued (step 186 in FIG. 12). The reset command resets the sequence values that are tagged to messages to the correct sequence number.

The ACSER component 118 determines whether the reset was successful or not (step 188 in FIG. 12). In particular, the ACSER component 118 determines whether the sequence error remains or not, and if the channel is running. If the sequence error remains, a notification of the problem is sent out to the appropriate parties (step 192 in FIG. 12). If the reset was successful, a notification indicating this success is sent out to the appropriate parties (step 190 in FIG. 12).

Those skilled in the art will appreciate that the notifications may take many forms. As mentioned above, the notifications may take the form of logging information into computer files or records. The notifications may also take the form of pages. The notifications may take the forms of facsimile messages or electronic mail messages. Notifications may also take the form of telephone calls that are initiated to attempt to inform appropriate parties of the problems.

The present invention also includes a reporting mechanism for generating historical data on CILR, CHESS and ACSER. This reporting mechanism allows the analyst to obtain historical data on the number of times this automation was functional. For example, a simple one page monthly report will show the number of times a channel was restarted, the number of times an initiator or listener was reset, and the number of times a sequence number was successfully corrected.

While the present invention has been described with reference to an illustrative embodiment thereof, those skilled in the are will appreciate that various changes in form and detail may be made without departing from the intended scope of the present invention as defined in the appended claims.

What is claimed is:

1. In a distributed system having a first queue for holding messages, a second queue for holding messages, a first queue manager for managing the first queue, a second queue manager for managing the second queue, a channel that interconnects the first queue manager with the second queue manager, an initiator for initiating the sending of a message over the channel and a listener for initiating the receiving of a message over the channel, a method comprising the computer-implemented steps of:

determining whether one of the listener and the initiator is inactive;

if it is determined that one of the listener and the initiator is inactive, taking corrective action to revive the one of the listener and the initiator that is inactive; and generating a notification if the corrective action fails to revive the inactive one of the listener and initiator.

2. The method of claim 1 wherein the notification is a report.

3. The method of claim 1 wherein the notification is a page.

4. The method of claim 1 wherein the determining of whether one of the listener and the initiator is inactive is performed automatically without user prompting.

5. The method of claim 1 wherein the step of taking of corrective action is performed automatically without user prompting.

6. The method of claim 1 wherein the first queue manager resides on a first computer system and the second queue manager resides on a second computer system that differs from the first computer system.

7. In a distributed system having a first queue for holding messages, a second queue for holding messages, a first queue manager for managing the first queue, a second queue manager for managing the second queue, a channel that interconnects the first queue manager with the second queue manager, an initiator for initiating the sending of a message over the channel and a listener for initiating the receiving of a message over the channel, a method comprising the computer-implemented steps of:

determining whether one of the listener and the initiator is inactive;

if it is determined that one of the listener and the initiator is inactive, taking corrective action to revive the one of the listener and the initiator that is inactive; and determining whether a quantity of messages enqueued in the first queue exceeds a threshold.

8. The method of claim 7 wherein if it is determined that the quantity of messages enqueued in the first queue does not exceed the threshold, terminating the method.

9. In a distributed system having a first queue for holding messages, a second queue for holding messages, a first queue manager for managing the first queue, a second queue manager for managing the second queue, a channel that interconnects the first queue manager with the second queue manager, an initiator for initiating the sending of a message over the channel and a listener for initiating the receiving of a message over the channel, a method comprising the computer-implemented steps of:

determining whether both of the listener and the initiator are inactive; and selectively taking corrective action to revive the listener and the initiator based on the determining step.

10. The method of claim 9 wherein corrective action is taken to revive both the initiator and the listener.

11. In a distributed system having a first queue for holding messages, a second queue for holding messages, a first queue manager for managing the first queue, a second queue manger for managing the second queue and a channel that interconnects the first queue manger with the second queue manger, a method comprising the computer-implemented steps of determining whether the channel has stopped;

if it is determined that the channel has stopped, automatically taking corrective action to revive the channel without prompting by a user; and generating a notification if the corrective action fails to revive the channel.

12. The method of claim 11 wherein the notification is a page.

13. The method of claim 11 wherein the notification is a report.

14. In a distributed system having a first queue for holding messages, a second queue for holding messages, a first queue manager for managing the first queue, a second queue manger for managing the second queue and a channel that interconnects the first queue manger with the second queue manger, a method comprising the computer-implemented steps of:

determining whether the channel has stopped;

if it is determined that the channel has stopped, automatically taking corrective action to revive the channel without prompting by a user;

determining whether the second queue manager is inactive; and preventing the corrective action from being taken if it is determined that the second queue manger is inactive.

15. In a distributed system having a first queue for holding messages, a second queue for holding messages, a first queue manager for managing the first queue, a second queue manager for managing the second queue and a channel that interconnects the first queue manager with the second queue manager, a method comprising the computer-implemented steps of:

determining whether the channel has stopped without user prompting;

if it is determined that the channel has stopped, automatically taking corrective action to revive the channel without prompting by a user; and generating a notification if the corrective action fails to revive the channel.

16. In a distributed computer system having a first message queue, a second message queue, a first queue manager for managing the first message queue, a second queue manager for managing the second message queue, a method comprising the computer-implemented steps of:

providing a sequence of messages to be sent over the channel, wherein each message is tagged with an associated sequence value that identifies a position of the message within the sequence;

detecting an out of sequence condition at one of the queue managers indicating a sequence error for at least one of the messages in the sequence;

initiating a reset of sequence values to a known sequence value such that a next message to be sent in the sequence over the channel is tagged with the known sequence value; and determining whether the reset was unsuccessful in resolving the sequence error.

17. The method of claim 16 further comprising the step of generating a notification when it is determined that resent was unsuccessful.

18. The method of claim 17 wherein the notification is a page.

19. The method of claim 17 wherein the notification is an electronic message.

20. In a distributed computer system having a first message queue, a second message queue, a first queue manager for managing the first message queue, a second queue manager for managing the second message queue, a method comprising the computer-implemented steps of:

providing a sequence of messages to be sent over the channel, wherein each message is tagged with an associated sequence value that identifies a position of the message within the sequence;

detecting an out of sequence condition at one of the queue managers indicating a sequence error for at least one of the messages in the sequence;

determining whether the channel is inactive; and initiating a reset of sequence values to a known sequence value such that a next message to be sent in the sequence over the channel is tagged with the known sequence value.

21. The method of claim 20 further comprising the step of preventing the initiating of the reset when it is determined that the channel is inactive.

22. In a distributed system having a first message queue, a second message queue, a first queue manager for managing the first message queue, a second queue manager for managing the second message queue, a channel for facilitating communications between the first queue manager and the second queue manager, a computer system, comprising:

a channel monitor for monitoring activity with respect to the channel to detect problems, wherein the channel monitor includes a detector for detecting that the first queue is excessively full; and a recovery component for automatically recovering from problems in response to detection from the channel monitor.

23. The computer system of claim 22 wherein the channel monitor includes a detector for detecting when the channel has failed.

24. In a distributed system having a first message queue, a second message queue, a first queue manager for managing the first message queue, a second queue manager for managing the second message queue, a channel for facilitating communications between the first queue manager and the second queue manager, a computer system, comprising:

a channel monitor for monitoring activity with respect to the channel to detect problems;

a recovery component for automatically recovering from problems in response to detection from the channel monitor; and a notification component for generating a notification if the recovery component is unsuccessful in recovery from a problem.

25. The computer system of claim 24 wherein the notification is a page.

* * * * *